United States Patent [19]

Schott et al.

[11] Patent Number: 4,578,846

[45] Date of Patent: Apr. 1, 1986

[54] APPARATUS FOR RIVET ATTACHMENT

[75] Inventors: John F. Schott, Fairborn; Thomas E. Endres, Dayton, both of Ohio

[73] Assignee: The International Tool Company, Dayton, Ohio

[21] Appl. No.: 583,344

[22] Filed: Feb. 24, 1984

[51] Int. Cl.⁴ .................... B23P 23/04; B23P 11/00
[52] U.S. Cl. ........................... 29/34 B; 29/243.53
[58] Field of Search ............. 29/33 R, 26 A, 34 B, 29/34 D, 33 K, 564.2, 56.5, 56.6, 34 R, 798, 809, 243.53, 243.54

[56] References Cited

U.S. PATENT DOCUMENTS

| 2,536,381 | 1/1951 | Mackey | 29/33 K X |
|---|---|---|---|
| 3,534,456 | 2/1969 | Swartz | 29/34 R |
| 3,534,896 | 8/1968 | Speller et al. | 227/51 |
| 3,557,442 | 4/1968 | Speller | 29/526 R |
| 3,574,918 | 4/1971 | Focht | 29/243.54 |
| 3,646,660 | 3/1972 | Sheffer, Jr. | 29/243.53 |
| 3,729,809 | 5/1973 | Vanter et al. | 29/243.53 |
| 3,747,193 | 7/1973 | Gregory | 29/243.53 |
| 3,802,060 | 4/1974 | Gross | 29/243.53 X |
| 4,044,462 | 8/1977 | Anselmo | 29/809 |
| 4,060,189 | 11/1977 | Vargo, Jr. et al. | 227/53 |
| 4,144,625 | 3/1979 | Hogenhout | 29/34 B |
| 4,270,253 | 6/1981 | Herb et al. | 29/26 A |
| 4,369,907 | 1/1983 | Muhr et al. | 29/34 B |
| 4,404,742 | 9/1983 | Fuhrmeister | 29/798 |
| 4,429,658 | 2/1984 | Jones | 118/711 |

FOREIGN PATENT DOCUMENTS

| 82680 | 6/1983 | European Pat. Off. | 29/34 B |
|---|---|---|---|
| 3225534 | 1/1984 | Fed. Rep. of Germany | 29/243.53 |
| 677801 | 8/1979 | U.S.S.R. | 29/33 K |

Primary Examiner—William R. Briggs
Attorney, Agent, or Firm—Jacox & Meckstroth

[57] ABSTRACT

Apparatus for attaching a device or element or the like to a work piece such as a panel or the like. Support structure supports a carriage which carries drill mechanism, liquid applicator mechanism, and rivet injector mechanism. The support structure also supports swage mechanism. A work piece is clamped in a given desired position, and the carriage sequentially moves the mechanism to drill, apply liquid, and to inject rivets through a predetermined portion of the work piece. An element or device is applied to the work piece so that the rivets extend through the device as well as through the work piece. Then swage mechanism swages the rivets to attach the device to the work piece.

21 Claims, 25 Drawing Figures

APPARATUS FOR RIVET ATTACHMENT

BACKGROUND OF THE INVENTION

Numerous types of panels or work pieces have devices attached thereto for various purposes. Problems arise in regard to accurate high speed attachment of the devices to such panels or work pieces. In the past a device has been rivet attached to a work piece by a method in which a hole is drilled in the work piece. A rivet is manually placed in the hole and manually retained in position in the work piece while an element or device is moved to a position to engage the work piece and so that the rivet extends through a portion of the device. Then the rivet is swaged to attach the device to the work piece. Thus, in the past rivet attachment of an element to a work piece has been substantially by manual operation or by attaching each rivet individually to a work piece and to a series of elements.

It is an object of this invention to provide apparatus which is capable of simultaneously drilling a plurality of holes in a work piece for receipt of rivets, simultaneously applying a metered quantity of a protective liquid or sealant liquid to the work piece adjacent each of the drilled holes, followed by simultaneously inserting rivets into all of the drilled holes, followed by automatically properly positioning an element in engagement with the work piece so that the rivets extend through the element, followed by simultaneously upsetting or swaging all of the rivets to attach the element to the work piece.

Other objects and advantages of this invention reside in the construction of parts, the combination thereof, the method of production, and the mode of operation, as will become more apparent from the following description.

SUMMARY OF THIS INVENTION

This invention comprises apparatus which automatically attaches an element or device to a work piece, such as a panel or the like. The apparatus drills a plurality of holes, applies a protective liquid or sealant liquid to the material surrounding the holes, inserts rivets into the holes, positions an element into engagement with the work piece so that the rivets extend through the element, followed by swaging the rivets to attach the element to the work piece.

The apparatus includes a drill head having a plurality of drills and mechanism for rotating the drills and for moving the drills with respect to a work piece. The apparatus also includes mechanism for accurately metering a quantity of liquid and for simultaneously applying the liquid to the region surrounding each of the drilled holes. The apparatus also includes mechanism for simultaneously transporting a plurality of rivets from a supply thereof to the work piece and for simultaneously inserting the rivets into the drilled holes. The apparatus also includes mechanism for transporting an element from a supply thereof to the work piece and for properly positioning the element so that the rivets extend through the element. The apparatus also includes mechanism for simultaneously swaging all of the rivets for attachment of the element to the work piece.

The apparatus includes means for automatically operating these mechanisms in a proper timed and sequential relationship and for operating a plurality of the operations simultaneously.

BRIEF DESCRIPTION OF THE VIEWS OF THE DRAWINGS

FIG. 1 is a perspective view of apparatus of this invention for rivet attachment of a device or element to a work piece, such as a panel or the like.

FIG. 2 is a fragmentary perspective view drawn on a much larger scale than FIG. 1, showing a device attached by means of rivets to a work piece in accordance with this invention.

DETAILED DESCRIPTION OF THE APPARATUS AND METHOD OF OPERATION

Figures 1, 2:
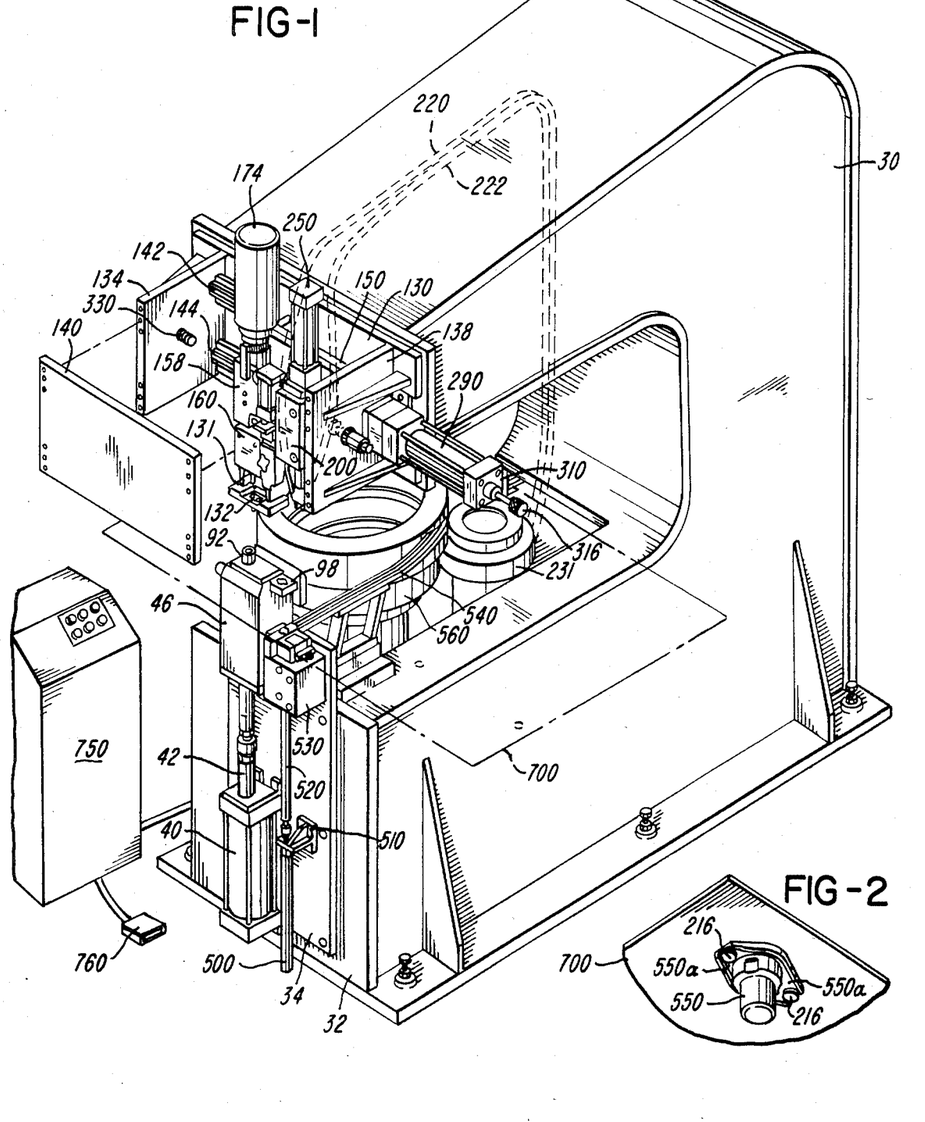
Figure 3:
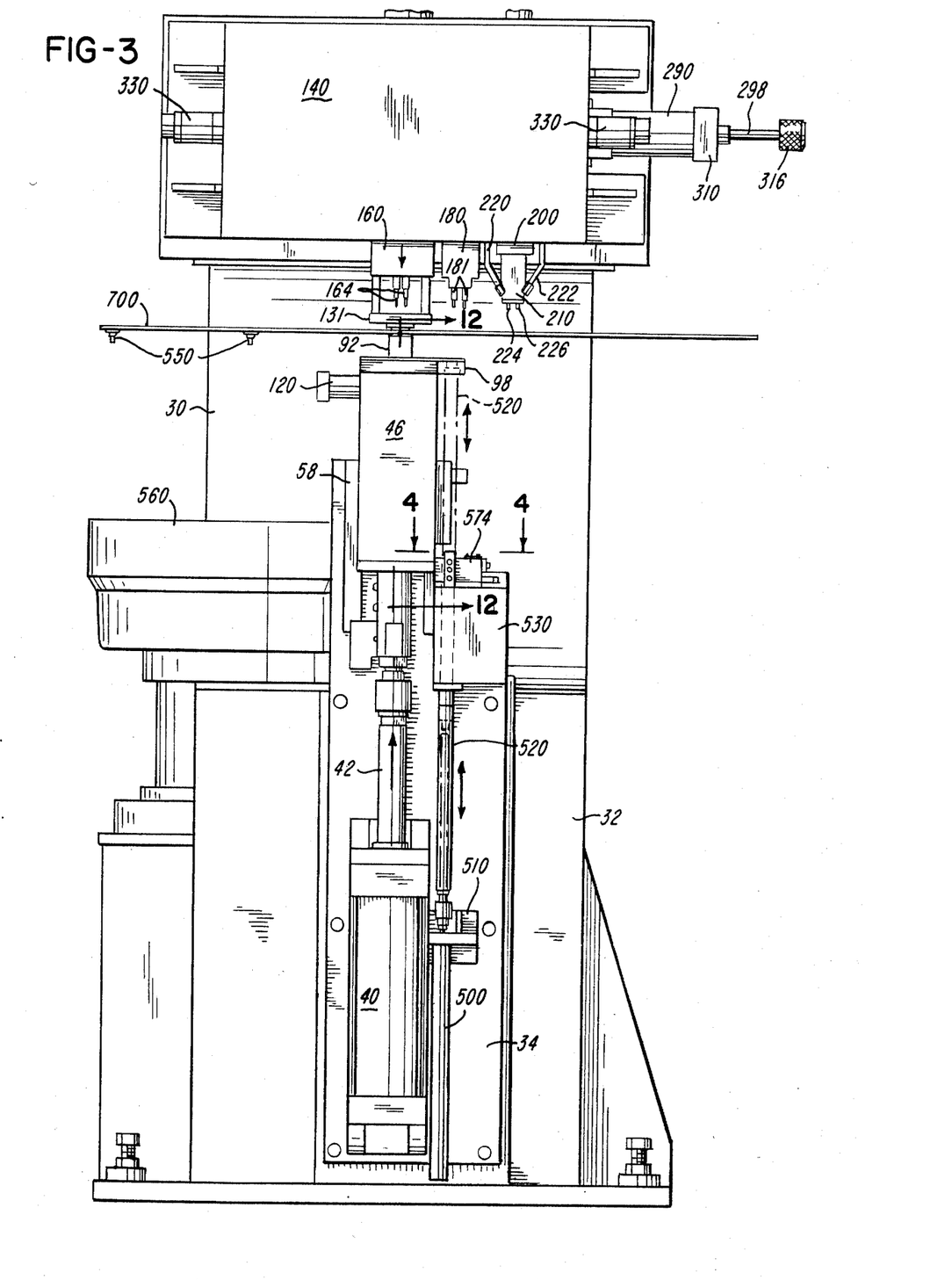
FIG. 3 is a front elevational view of the apparatus of FIG. 1, drawn on a larger scale than FIG. 1.

FIG. 1 illustrates generally the apparatus of this invention. A generally C-shape frame 30 supports the apparatus of this invention. The frame 30 has a lower front portion 32 which supports a front plate 34 to which is attached a main fluid motor 40 which has an actuator rod 42 extending substantially vertically thereabove. Also above the main fluid motor 40 is a housing 46 provided with a chamber 47 therein, best shown in FIG. 12, within which is positioned a piston 48. The piston 48 is attached to the actuator rod 42. Attached to the upper portion of the piston 48 is an auxiliary rod 50 which is substantially vertical within the chamber 47 and which has a portion within a guide passage 54 which is at the upper part of the housing 46. The housing 46 is movable upwardly and downwardly within guide rails 58. In fluid communication with the chamber 47 within the housing 46 is a fluid conduit 62.

Figures 15, 16, 17, 18, 19, 20, 21:
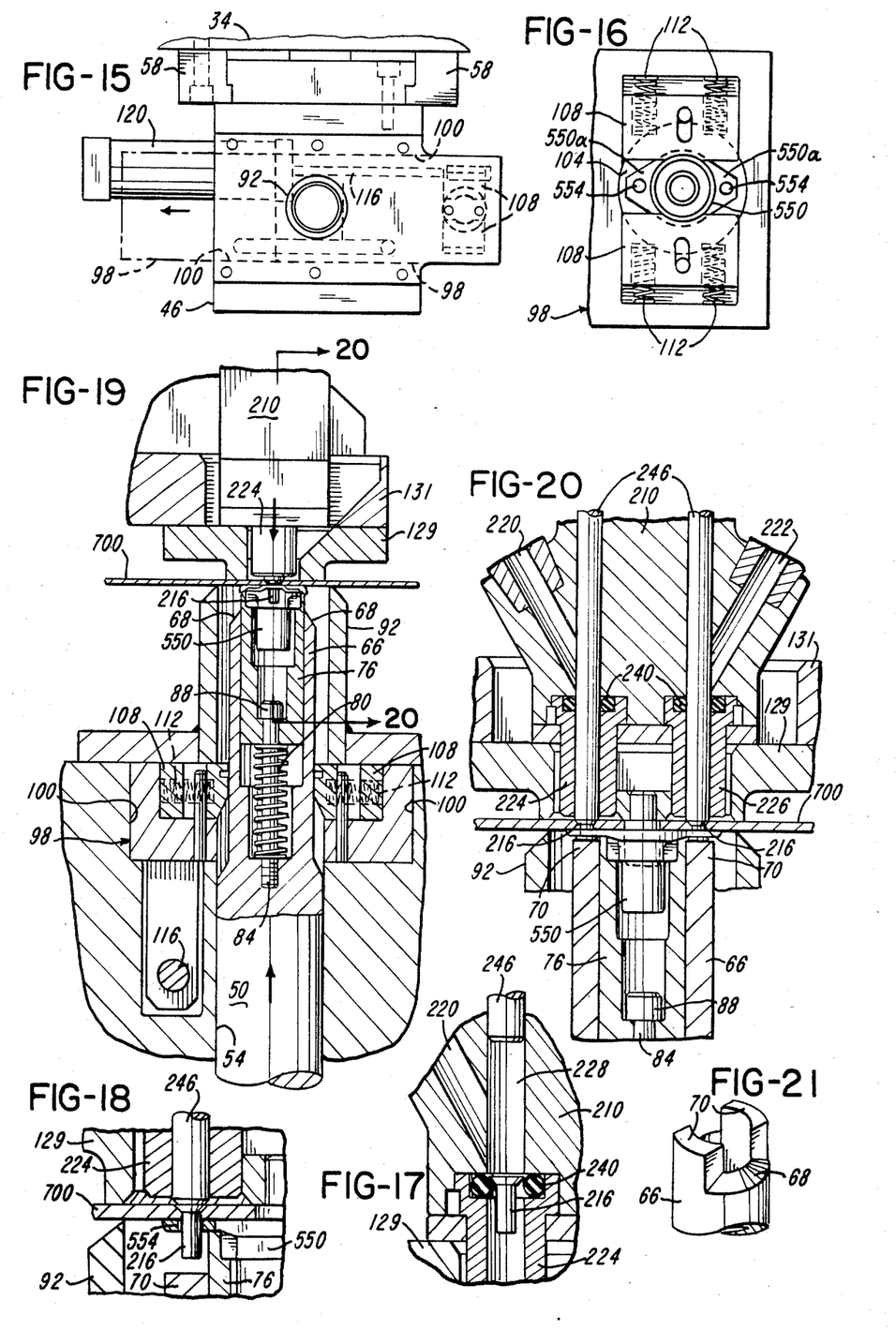
FIG. 15 is an enlarged fragmentary plan view taken substantially on line 15—15 of FIG. 11.
FIG. 16 is an enlarged fragmentary plan view taken substantially on line 16—16 of FIG. 11.
FIG. 17 is an enlarged sectional view drawn on a larger scale than FIG. 16, showing a rivet retainer member with a rivet retained thereby prior to movement of the rivet to a work piece.
FIG. 18 is an enlarged fragmentary sectional view, drawn on substantially the same scale as FIG. 17, showing a rivet positioned in a work piece.
FIG. 19 is an enlarged fragmentary sectional view, drawn on a smaller scale than FIGS. 17 and 18, showing a portion of the apparatus illustrated in FIG. 12 and showing a rivet positioned within the work piece.
FIG. 20 is an enlarged fragmentary sectional view taken substantially on line 20—20 of FIG. 19.
FIG. 21 is an enlarged fragmentary perspective view, drawn on a larger scale than FIG. 20, illustrating the rivet swaging member of the apparatus.

As best shown in FIG. 19, at the upper portion of the auxiliary rod 50 is a tubular engagement member 66 or anvil having a cam surface 68 at the upper end thereof, as best shown in FIG. 21. The upper end of the tubular engagement member or anvil 66 also has a swaging surface 70, as shown in FIGS. 20 and 21.

Within the tubular engagement member 66 is a tubular lift member 76 which is urged upwardly by a spring 80 which encompasses a stem 84 which extends into the lift member 76. The stem 84 is threadedly attached to the auxiliary rod 50 and has a head 88 within the lift member 76. The lift member 76 is axially movable within the engagement member 66.

Figure 12:
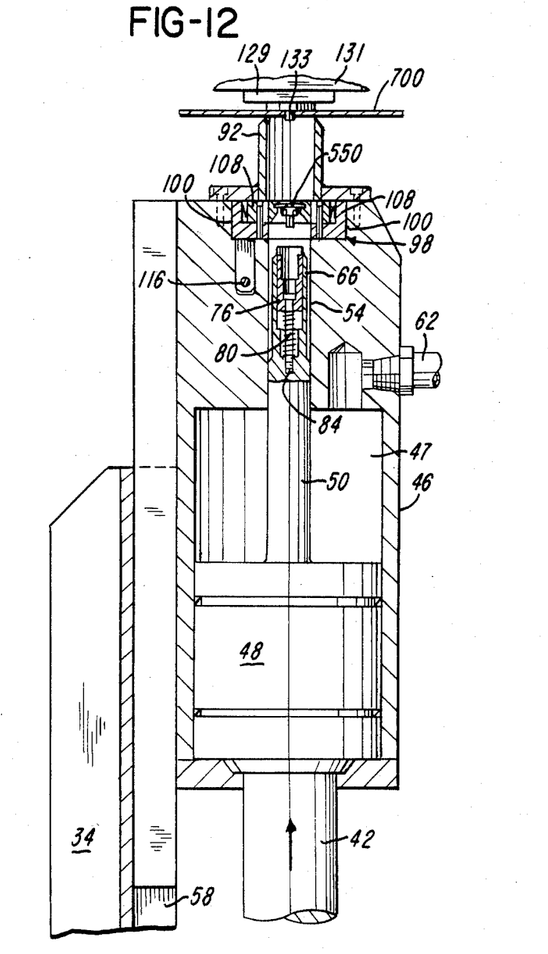
FIG. 12 is a fragmentary sectional view, taken substantially on line 12—12 of FIG. 3, and drawn on a larger scale than FIG. 11.

As best shown in FIG. 12, at the upper portion of the housing 46, extending upwardly therefrom and secured thereto, is a clamping cylinder 92.

At the upper portion of the housing 46, immediately below the clamping cylinder 92 is a shuttle member 98 which is transversely movable along guide members 100, shown in FIG. 15. The shuttle member 98 has an opening 104 provided with clamp members 108 which are urged one toward the other by springs 112, best shown in FIG. 16.

Figure 11:
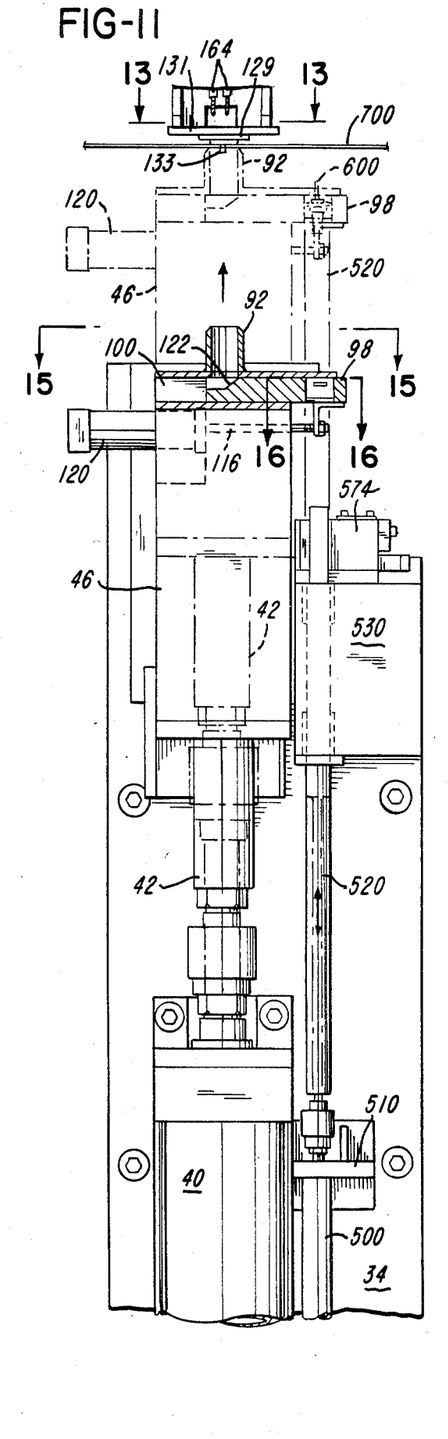
FIG. 11 is a fragmentary front elevational view, drawn on a slightly larger scale than FIG. 3, illustrating the drill position of the apparatus and operation of the elevator portion of the apparatus.

A rod 116, shown in FIGS. 11, 12 and 19 is attached to the shuttle 98 and is also attached to a fluid motor 120 for movement of the shuttle 98. As shown in FIG. 11, the shuttle 98 has an inclined surface 122 at one portion thereof.

Figure 13:
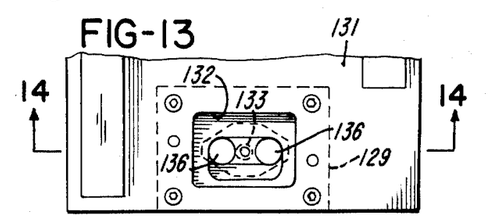
FIG. 13 is a fragmentary sectional view taken substantially on line 13—13 of FIG. 11, and drawn on a larger scale than FIG. 11.
Figure 14:
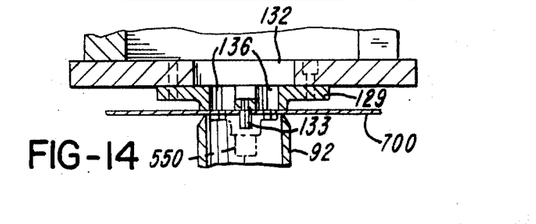
FIG. 14 is a fragmentary sectional view taken substantially on line 14—14 of FIG. 13.

Supported by the upper portion of the C-shape frame 30 is a back plate 130. Attached to the back plate 130 and extending forwardly therefrom is a bracket 131 provided with an opening 132 therethrough, as shown in FIGS. 1, 13 and 14. The bracket 131 has a clamping member 129 mounted beneath the opening 132. The clamping member 129 is provided with a pair of openings 136 therein, as best shown in FIGS. 13 and 14. The clamping member 129 has a downwardly extending alignment stud 133 attached thereto and positioned substantially at the central portion of the opening 132.

Extending from the back plate 130 and attached thereto are spaced-apart vertically extending transverse plates 134 and 138, best shown in FIG. 1. A cover plate 140 is attached to the transverse plates 134 and 138. Attached to the back plate 130, between the transverse plates 134 and 138 are spaced-apart rails 142 and 144, shown in FIGS. 1 and 8. Mounted upon the rails 142 and 144 is a main carriage 150.

Mounted upon the main carriage 150 is an auxiliary carriage 158 which supports a drill unit 160 provided with a pair of drills 164. The auxiliary carriage 158 is attached to a linearly operable fluid motor 170 for upward and downward movement of the auxiliary carriage 158. Also attached to the auxiliary carriage 158 for upward and downward movement with the auxiliary carriage 158 is a rotational drive motor 174 which is operably joined to the drills 164 for rotation thereof.

Adjacent the auxiliary carriage 158 and mounted upon the main carriage 150 is an auxiliary carriage 180 which supports a pair of liquid dispenser nozzles 181. The auxiliary carriage 180 is operably attached to a linearly operable fluid motor 179 for upward and downward movement of the auxiliary carriage 180.

Figure 22:
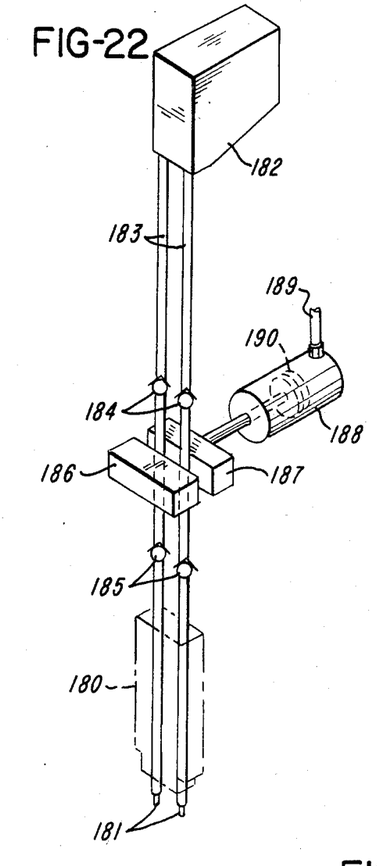
FIG. 22 is a diagrammatic type of view illustrating the liquid dispenser mechanism.

FIG. 22 shows diagrammatically the liquid dispenser apparatus which is joined to the liquid dispenser nozzles 181. A reservoir 182 provides a supply of liquid. Extending downwardly from the reservoir 182 are liquid conduits 183, the lower ends of which are connected to the fluid dispenser nozzles 181. Each liquid conduit 183 is of flexible tubular material. Within each liquid conduit 183, spaced from the reservoir 182, is a first check valve 184. Within each liquid conduit 183 and spaced from the first check valve 184 is a second check valve 185. Each second check valve 185 is preferably adjacent its respective liquid dispenser nozzle 181. Positioned adjacent the liquid conduits 183 between each first check valve 184 and its respective second check valve 185 is a stationary squeeze member 186 and a movable squeeze member 187. The stationary squeeze member 186 and the movable squeeze member 187 are positioned at opposite portions of the liquid conduits 183. The movable squeeze member 187 is movable by a linearly operable fluid motor 188 to which a fluid conduit 189 is connected. Within the fluid motor 188 is a piston 190 which is movable to move the movable squeeze member 187.

Figure 24:
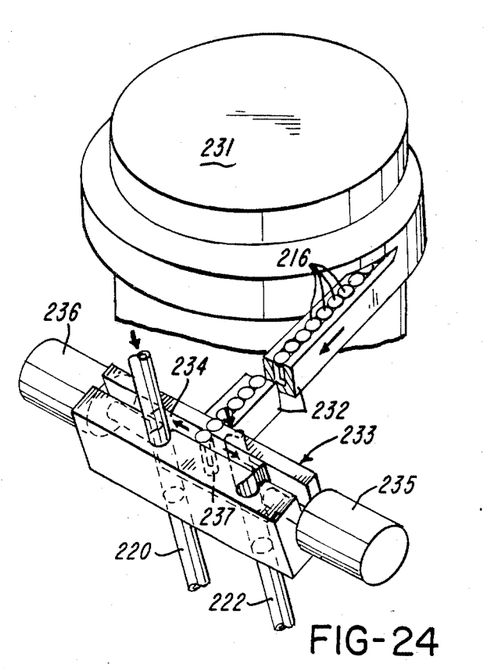
FIG. 24 is a diagrammatic type of view illustrating the rivet feed mechanism.

Adjacent the auxiliary carriage 180 is an auxiliary carriage 200 which supports a rivet injector mechanism 210, for injecting rivets 216. The rivet injector mechanism 210 includes rivet conduits 220 and 222, as best shown in FIGS. 1, 20, 24, and 25. The rivet conduits 220 and 222 are in communication with rivet injector tubes 224 and 226, and rivet injector passages 228 and 229, respectively. FIG. 24 shows diagrammatically a rivet container-dispenser 231. Extending from the rivet container-dispenser 231 is a rivet track 232, which carries rivets 216 in close seriatim relationship. Joined to the rivet track 232 is an escapement mechanism 233 which includes a reciprocally movable carrier 234. The carrier 234 is connected to a solenoid operable actuator 235 at one end therof and is connected to a solenoid operable actuator 236 at the other end thereof. The carrier 234 is movable for travel of the pocket 237 between the rivet conduits 220 and 222 which are joined to the escapement mechanism 233. Within each rivet injector tube 224 and 226, at the upper portion thereof, is an elastomeric ring 240, best shown in FIGS. 17 and 20. The lower end of each rivet injector tube 224 and 226 is positioned at the lower portion of the rivet injector mechanism 210.

Figure 25:
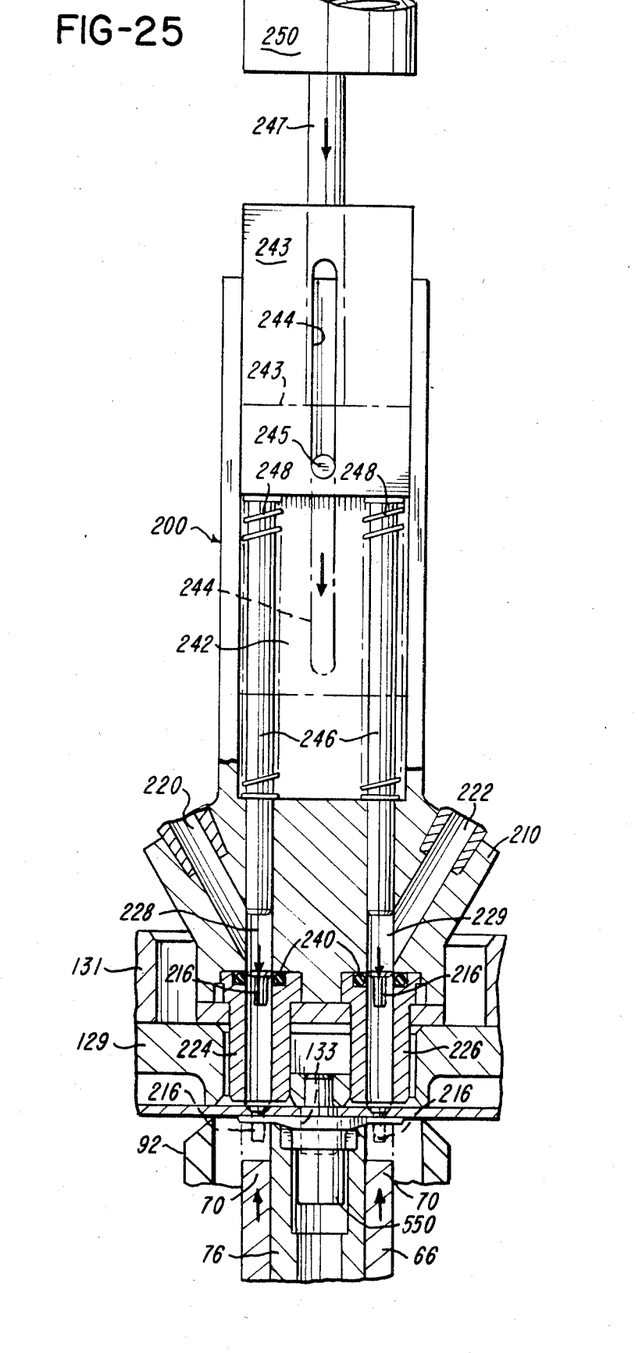
FIG. 25 is an enlarged sectional and diagrammatic type of view illustrating the rivet injector mechanism. This figure is drawn on substantially the same scale as FIG. 20 and shows a portion of the mechanism of FIG. 20.

As best illustrated in FIG. 25 the auxiliary carriage 200 has a cavity 242 therein. Within the cavity 242, at the upper portion thereof is a plunger 243, which has a slot 244 therethrough. Within the cavity 242 below the plunger 243 are springs 248 which urge the plunger 243 upwardly. A pin 245 is attached to the auxiliary carriage 200 and extends through the slot 244. At the lower portion of the plunger 243 are a pair of injector rods 246, each of which is positioned within one of the injector tubes 224 and 226 and is axially movable therewithin. At the upper portion of the plunger 243 is an actuator rod 247 which is attached to a fluid motor 250 which is attached to the main carriage 150.

Figure 8:
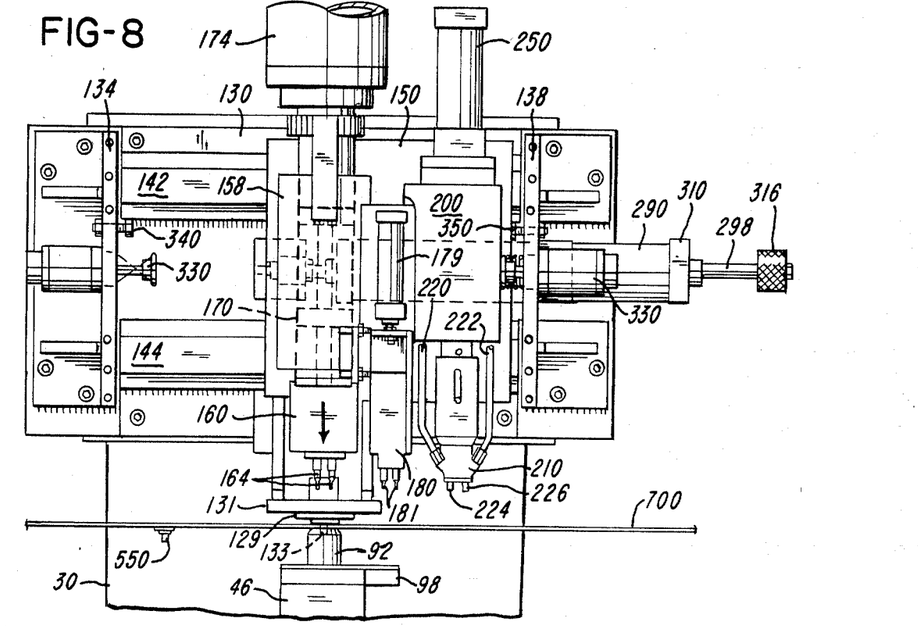
FIG. 8 is a fragmentary front elevational view of the apparatus of FIG. 1, drawn on a larger scale than FIG. 1, illustrating the drill position of the apparatus. This view also shows a work piece in position for operation thereupon by the apparatus of this invention.
Figures 9, 10:
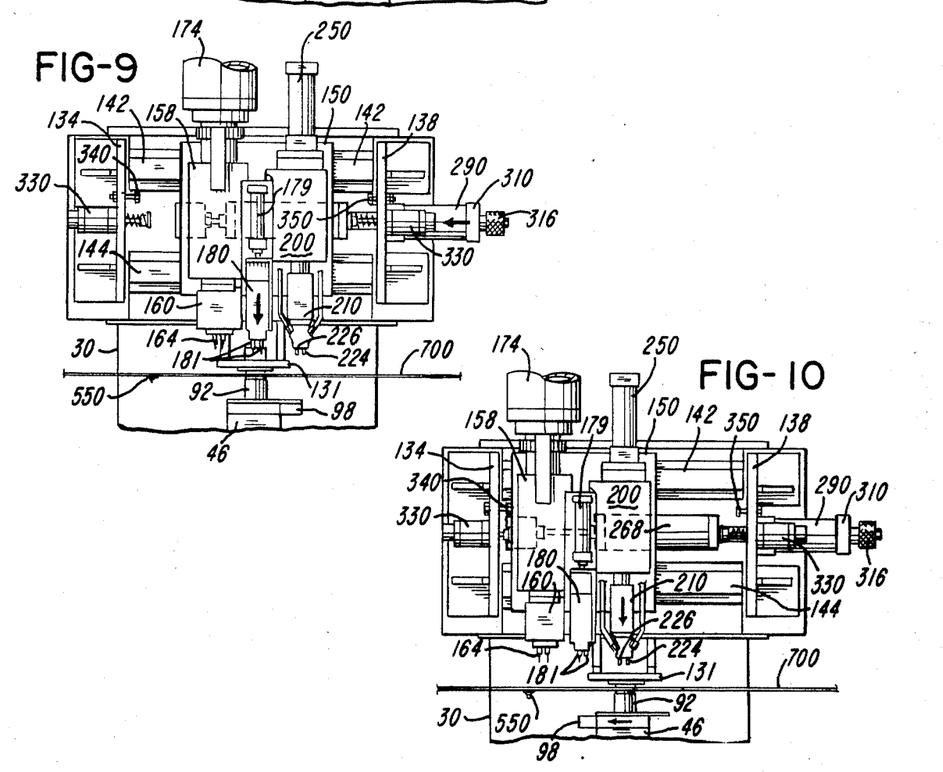
FIG. 9 is a fragmentary front elevational view of the apparatus of FIG. 1, drawn on a smaller scale than FIG. 8, illustrating the sealant position of the apparatus.
FIG. 10 is a fragmentary front elevational view of the apparatus of FIG. 1, drawn on substantially the same scale as FIG. 9, illustrating the rivet position of the apparatus.
Figure 23:
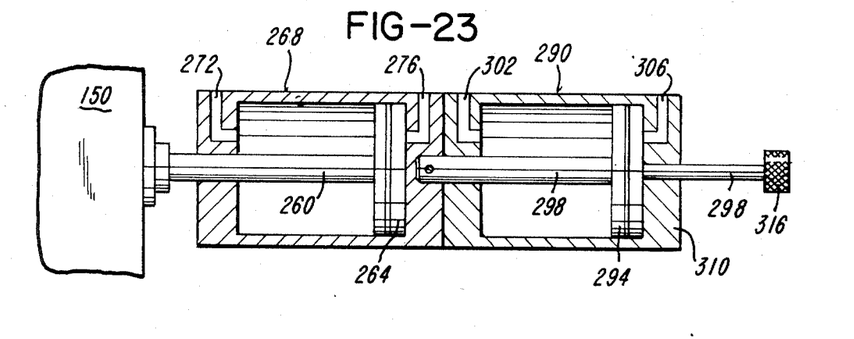
FIG. 23 is a diagrammatic type of view illustrating the carriage operation mechanism.

As illustrated in FIG. 23, the carriage 150 has attached thereto an actuator rod 260 which is attached to a piston 264 within a fluid housing 268. A fluid conduit 272 is in communication with one end of the fluid housing 268, and a fluid conduit 276 is in communication with the opposite end of the fluid housing 268. Adjacent the fluid housing 268 is a fluid housing 290, within which is a piston 294 which is connected to a piston rod 298, one end of which is attached to the end wall of the fluid housing 268. A fluid conduit 302 is in communication with one end of the fluid housing 290, and a fluid conduit 306 is in communication with the opposite end of the fluid housing 290. The other end of the piston rod 298 extends through an end wall 310 of the fluid housing 290 and has attached thereto an abutment member 316. FIGS. 8 and 9 show shock absorbers 330 engageable by the carriage 150. FIGS. 8 and 9 also show an abutment 340, engageable by the carriage 150, to establish the proper position for operation of rivet injector mechanism 210 and an abutment 350 engageable by the carriage 150 to establish the proper position for position of the drill unit 160.

Adjacent the main fluid motor 40 is an elevator motor 500 which is attached to the front plate 34 by means of a bracket 510. The elevator motor 500 has an elevator rod 520 thereabove which is movable upwardly and downwardly. The elevator rod 520 extends into an auxiliary housing 530 which is provided with a chamber 536 which is joined to a track 540. The track 540 conducts elements 550 from a container 560, shown in FIG. 1. Herein, the elements 550 are shown as being fastener nuts, each of which has a pair of flanges 550a. Each flange 550a has an opening 554 therethrough, best shown in FIG. 4.

Figures 4, 5, 6, 7:
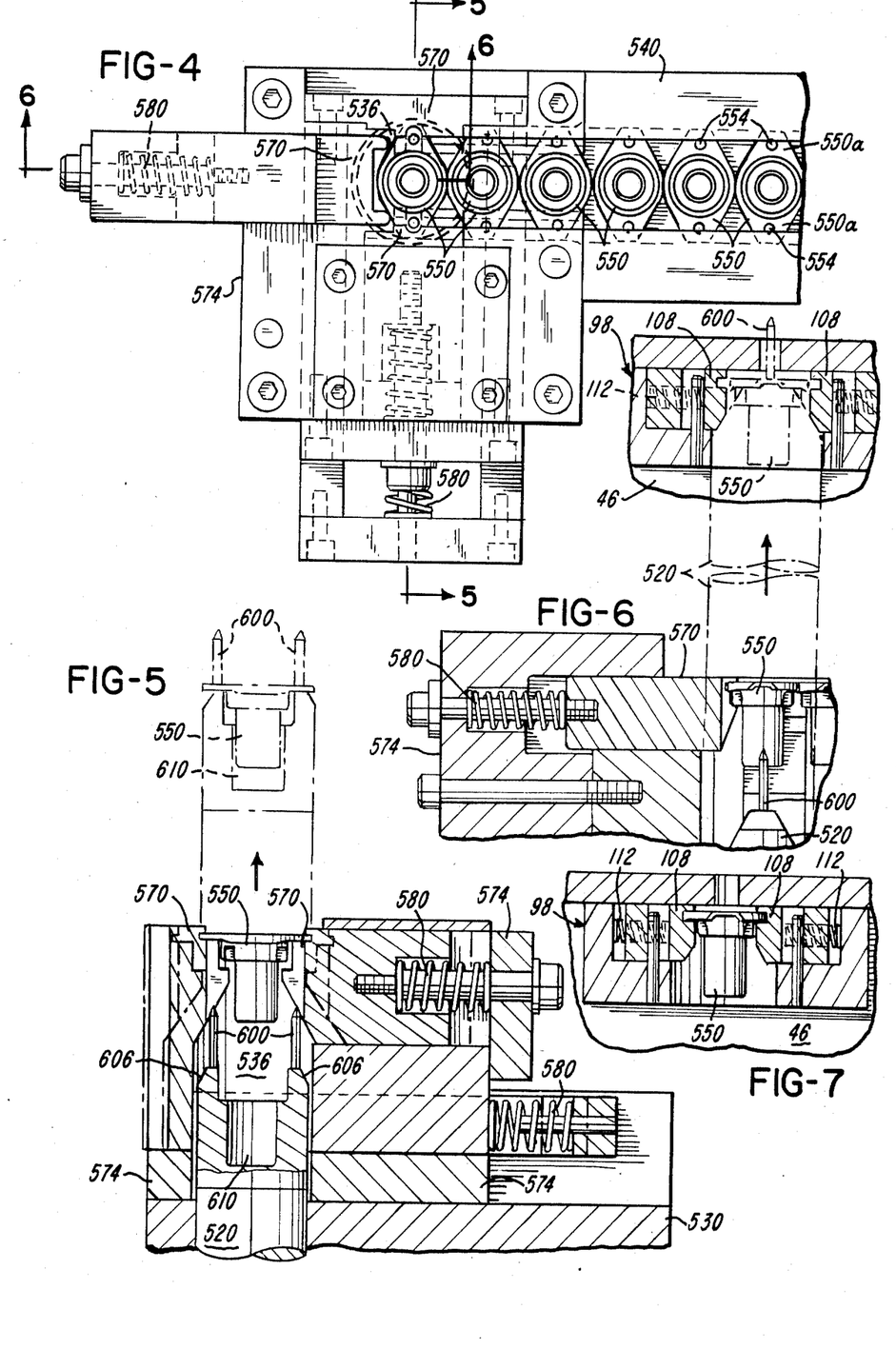
FIG. 4 is an enlarged sectional view, taken substantially on line 4—4 of FIG. 3.
FIG. 5 is a fragmentary sectional view taken substantially on line 5—5 of FIG. 4.
FIG. 6 is a fragmentary sectional view taken substantially on line 6—6 of FIG. 4.
FIG. 7 is a fragmentary sectional view of a portion of the apparatus of FIG. 6 and showing parts in another (clamped) position.

FIG. 4 illustrates a plurality of the fastener nuts 550 carried by the track 540 from the container 560 to the chamber 536, as the fastener nuts 550 travel in juxtaposed seriatim relationship. Extending into the chamber 536 are a plurality of retainer jaws 570 each of which is carried by a carrier 574 which is supported by the auxiliary housing 530. Each jaw 570 has a portion which is urged into the chamber 536 by a spring 580 which engages the respective carrier 574.

The upper portion of the elevator rod 520 is provided with a pair of upwardly extending pins 600. Adjacent the lower portion of each of the pins 600 is a cam surface 606. The upper portion of the elevator rod 520 has a cavity 610.

OPERATION

The apparatus of this invention provides means by which elements 550, herein shown as being fastener nuts, are attached by rivets 216 to a work piece, herein shown as being a panel 700.

Herein the panel 700 is one in which spaced-apart openings, not shown, have been formed. Each opening is adapted and positioned to receive a fastener nut 550. Fastener nuts 550 are to be attached to the panel 700 so that each fastener nut is in alignment with one of the openings in the panel 700. For attachment of the fastener nuts 550 to the panel 700, the panel 700 is positioned below the bracket 131 and the clamping member 129 so that the downwardly extending stud 133 extends through one of the openings in the panel 700, as best illustrated in FIGS. 11 and 12. A control cabinet 750 adjacent the frame 30 has a foot switch 760 associated therewith. An operator of the apparatus depresses the foot switch 760, and the control circuit, not shown, within the control cabinet 750 functions to energize the main fluid motor 40. Thus, the actuator rod 42 is moved upwardly. Constant fluid pressure is applied through the fluid conduit 62 to the piston 48 within the housing 46. The fluid pressure within the housing 46 urges the piston 48 downwardly. When the actuator rod 42 is moved upwardly, the piston 48, attached thereto, is moved upwardly, and the housing 46 is moved upwardly until the cylindrical clamping member 92 engages the lower surface of the panel 700 and forces the panel against the clamping member 129. The cylindrical clamping member 92 then encompasses the stud 133, as illustrated in FIGS. 10 and 11. The fluid pressure within the housing 46, above the piston 48, serves as a cushion as the cylindrical clamping member 92 moves into engagement with the panel 700.

After the cylindrical clamping member 92 engages the panel 700, the control circuitry causes fluid to flow into the fluid motor 170, and the drill unit 160 is moved downwardly into engagement with the panel 700, and the drive motor 174 rotates the drills 164. Thus, a pair of holes is drilled through the panel 700 so that there is one hole on each of opposite portions of the stud 133. Then the control circuitry raises the drill unit 160 to the position thereof shown in FIG. 8.

Then the control circuitry causes fluid to flow into the fluid conduit 306, shown in FIG. 23. Thus, the piston 294 and the piston rod 298 are forced to the left. The piston rod 298 forces the fluid housing 268, with the piston 264 therein to the left, and the actuator rod 260 is moved to the left, moving the carriage 150 to the left. The abutment member 316 engages the end wall 310, as shown in FIG. 9, and establishes a predetermined position of the carriage 150. When this occurs, the liquid dispenser nozzles 181 are positioned above the bracket 131, as shown in FIG. 9. Then the control circuitry causes the fluid motor 179 to move the liquid dispenser nozzles 181 downwardly to a position immediately above the holes which were drilled by the drills 164. Then the piston 190 of the fluid motor 188 forces the movable squeeze member 187, shown in FIG. 22, into engagement with the conduits 183, squeezing the portion of the conduits 183 which is located between the check valves 184 and 185. Thus, a precise volume of liquid flows from the nozzles 181 upon the portions of the panel 70 which are adjacent the holes which were drilled by the drills 164. The liquid may be an anti-rust material, or a sealant, or any other desired material.

Then the control circuitry causes fluid to flow into the fluid conduit 276 of the mechanism shown in FIG. 23. Thus, fluid engages the piston 264 and forces the piston rod 260 farther to the left, forcing the carriage 150 farther to the left. The carriage 150 engages the abutment 340, as shown in FIG. 10, and another desired position of the carriage 150 is established. The rivet injector mechanism 210 is thus positioned above the bracket 131, as shown in FIG. 10. Rivets 216 travel from the container-dispenser 231 and are arranged in close seriatim relationship upon the rivet track 232, shown in FIG. 24. The leading rivet 216 is positioned within the pocket 237 of the carrier 234. Immediately following movement of the rivet injector mechanism 210 to its position immediately above the bracket 131, the control circuitry causes energization of the solenoid 235 and the rivet 216 within the pocket 237 of the carrier 234 is moved by the carrier 234 to the injector conduit 222. Then a succeeding rivet 216 moves into the pocket 237 of the carrier 234. Then the solenoid 236 is energized and the carrier 234 moves the next rivet 216 to the conduit 220. The rivets 216 travel in the conduits 220 and 222 to the elastomeric rings 240, shown in FIG. 17 and are retained thereby momentarily.

During the short period of time that the apparatus operates in the manner discussed above to drill holes in the panel 700, to apply liquid thereto, and to move rivets 216 to the elastomeric retainer rings 240, the portion of the apparatus below the panel 700 is also functioning. The track 540 carries fastener nuts 550 in close seriatim relationship from the container 560 to the retainer 536, as shown in FIG. 4. Each fastener nut 550 is retained momentarily in the retainer 536 by the jaws 570.

Then the elevator fluid motor 500 is energized, and the elevator rod 520 moves upwardly. The pins 600 move into the openings 554 in the flanges 550a of the fastener nut 550 which is retained by the jaws 570. As illustrated in FIG. 5, the cam surfaces 606 adjacent the pins 500 force the jaws 570 away from the fastener nut 550, and the fastener nut 550 is moved upwardly at the upper portion of the elevator rod 520 as the fastener nut 550 is positioned within the cavity 610 and moved into the shuttle 98, as shown in FIGS. 6, 7, 15 and 16. The fluid motor 120, shown in FIG. 15, then moves the shuttle 98, which moves the fastener nut 550 to a position above the tubular lift member 76, as shown in FIG. 12.

Then a second level of fluid pressure is applied to the main fluid motor 40, and the actuator rod 42 is raised farther. Thus, the fluid within the housing 46 above the piston 48 is compressed to a greater degree. The auxiliary rod 50 above the piston 48 is moved farther upwardly, and the fastener nut 550 is moved upwardly into engagement with the lower surface of the panel 700, as best illustrated in FIG. 19. Then the fluid motor 250, best shown in FIG. 25, is energized and the actuator rod 247 is moved downwardly, moving the plunger 243 downwardly. Due to the fact that the force of the springs 248 is significant, downward movement of the actuator rod 247 moves the rivet injector mechanism 210 downwardly until the rivet injector tubes 224 and 226 engage the panel 700.

Then the fluid motor 250 applies a greater force to the actuator rod 247, and the actuator rod 247 moves the plunger 243 downwardly against the force of the springs 248. Thus, the injector rods 246 are moved downwardly. The injector rods 246 engage the rivets 216 which are retained by the elastomeric rings 240 and move the rivets 216 into the openings drilled therefor in the panel 700, as described above. Then the main fluid motor 40 is operated to apply a greater upward force to the actuator rod 42 and to the auxiliary rod 50. The engagement member or anvil 66 carried by the auxiliary rod 50 is forced upwardly into engagement with the lower ends of the rivets 216, and the lower ends of the rivets 216 are swaged over. Thus, the fastener nut 550 is secured to the panel 700, as illustrated in FIGS. 2 and 20.

Then the foot switch 760 is released and the main fluid motor 40 returns the actuator rod 42 to its retracted position, ready for another actuation. At the same time the pistons 264 and 294 are moved to the right, to move the fluid housing 268 and the pistons 264 and 294 to the positions thereof shown in FIG. 23, ready for another sequence of actuations.

The operator then moves the work piece or panel 700 to another position with respect to the frame 30, and again depresses the foot switch 760, and the fastening process described above is repeated.

Although the preferred embodiment of the apparatus and method of this invention has been described, it will be understood that within the purview of this invention various changes may be made in the form, details, proportion and arrangement of parts, the combination thereof, and the mode of operation, which generally stated consist in a structure and method within the scope of the appended claims.

The invention having thus been described, the following is claimed.

1. Apparatus for attachment of a device to a work piece comprising:
    support structure,
    operator means carried by the support structure for operation upon the work piece,
    clamp means carried by the operator means for clamping a work piece,
    carriage means carried by the support structure,
    drill means carried by the carriage means for simultaneously drilling a plurality of holes in a work piece which is retained by the clamp means,
    liquid applicator means carried by the carriage means for applying liquid to the work piece adjacent the holes drilled by the drill means,
    rivet injector means carried by the carriage means for simultaneously injecting a rivet into each of the holes which have been drilled by the drill means and to which liquid has been applied,
    a source of rivets supported by the support structure,
    rivet transfer means supported by the support structure for transferring a plurality of rivets from the source of rivets to the rivet injector means,
    a source of devices carried by the support structure,
    device applicator means supported by the operator means for applying a device to the work piece in alignment with the holes drilled by the drill means and in alignment with the rivets injected into the work piece so that the rivets extend through the work piece and through the device,
    device transfer means supported by the support structure for transferring a device from the source of devices to the device applicator means,
    swage means supported by operator means for swaging the rivets which extend through the device and through the work piece, to attach the device to the work piece.

2. The apparatus of claim 1 in which the liquid applicator means includes a container of liquid, a plurality of nozzles, a plurality of flexible liquid conduits extending from the container to the nozzles, a pair of spaced-apart check valves within each liquid conduit, squeeze means for squeezing the liquid conduits between the check valves for forcing a precise volume of liquid from the liquid conduits to the nozzles and to the work piece.

3. The apparatus of claim 1 in which the rivet transfer means includes a carrier mechanism provided with a reciprocally movable carrier member having a pocket therein, a plurality of rivet conduits extending from the carrier mechanism to the rivet injector means, a rivet conductor for conducting rivets from the source of rivets to the carrier mechanism, the pocket of the carrier mechanism receiving a rivet from the rivet conductor, means for reciprocally moving the carrier member to move a rivet in the pocket thereof to each of the rivet conduits.

4. The apparatus of claim 1 in which the swage means and the device applicator means are operably connected.

5. The apparatus of claim 1 in which the device transfer means comprises a track upon which devices travel from the source of devices, retainer means adjacent the track for retaining a device in desired orientation, a shuttle supported by the operator means, elevator means for moving a device from the retainer means to the shuttle, the shuttle including a shift member for shifting a device from a first position to a second position, the device applicator means includes means for moving a device from the second position of the shift member to the work piece.

6. Apparatus for attaching a device to a panel, in which the apparatus has support structure provided with a lower portion and an upper portion, the apparatus being adapted to receive a panel between the upper portion and the lower portion, comprising:

fluid motor means attached to the lower portion of the support structure and provided with a main actuator member which is movable upwardly and downwardly with respect to the support structure, a housing attached to an upper portion of the actuator member, a piston within the housing and movable upwardly and downwardly therewithin, means for applying a fluid pressure upon the piston to urge the piston downwardly, an auxiliary actuator member attached to the upper portion of the piston and extending upwardly through the housing, a lift member carried by the upper portion of the auxiliary actuator member, transfer mechanism carried by the housing, receiver mechanism attached to the lower portion of the support structure for receiving devices for attachment to a panel, an elevator member attached to the lower portion of the support structure, the elevator member being movable to elevate a device from the receiver mechanism to the transfer mechanism, the auxiliary actuator mechanism being movable upwardly by the fluid motor means with movement of the piston to move the lift member to lift a device from the transfer mechanism to a panel which is positioned between the upper portion of the support structure and the lower portion of the support structure, rivet injector means carried by the upper portion of the support structure for applying a rivet to a panel which is positioned between the upper portion of the support structure and the lower portion of the support structure as the rivet extends through the panel and through a device in engagement with the panel, and swage means carried by the auxiliary actuator mechanism and engageable with a rivet which extends through the panel and through a device which is in engagement with the panel to swage the rivet to attach the device to the panel.

7. Apparatus for attaching a device to a panel, in which the apparatus has support structure provided with a lower portion and an upper portion, the apparatus being adapted to receive a panel between the upper portion and the lower portion, comprising:

fluid motor means attached to the lower portion of the support structure and provided with a main actuator member movable upwardly and downwardly with respect to the lower portion of the support structure, a lift member, means attaching the lift member to the main actuator member for movement therewith, first transfer mechanism, receiver mechanism attached to the lower portion of the support structure for receiving a device for attachment to the panel, second transfer means attached to the lower portion of the support structure and movable to transfer a device from the receiver mechanism to the first transfer mechanism, .

the first transfer mechanism transferring the device to a position above the main actuator member, the lift member lifting the device from the first transfer mechanism to a position in engagement with the panel with movement of the main actuator member, rivet injector means, means supporting the rivet injector means at the upper portion of the support structure for moving a rivet through the panel and through a device which is in engagement with the panel, and swage means carried by the main actuator member and movable therewith for swaging a rivet which extends through the panel and through a device which is in engagement with the panel for attaching the device to the panel.

8. The apparatus of claim 7 which includes drill means carried by the upper portion of the support structure and operable to drill a hole through a panel which is positioned between the upper portion of the support structure and the lower portion of the support structure.

9. The apparatus of claim 7 which includes liquid dispenser means carried by the upper portion of the support structure and operable to apply a quantity of liquid to a portion of the panel prior to insertion of a rivet therethrough for attachment of a device to the panel.

10. The apparatus of claim 7 in which the rivet injector mechanism includes a source of rivets and transfer means for transferring a rivet from the source of rivets to the panel.

11. The apparatus of claim 7 which includes liquid dispenser means carried by the upper portion of the support structure and operable to apply a quantity of liquid to a portion of the panel prior to insertion of a rivet therethrough for attachment of a device to the panel, the liquid dispenser means including a source of liquid, a nozzle, a liquid conduit extending from the source of liquid to the nozzle, a pair of check valves within the liquid conduit, the liquid conduit having a flexible portion between the check valves, squeeze mechanism for squeezing the liquid conduit between the check valves to force a predetermined quantity of liquid from the liquid conduit to the nozzle and from the nozzle to the panel.

12. The apparatus of claim 7 which includes a movable carriage, means supporting the movable carriage upon the upper portion of the support structure, drill means carried by the carriage and operable to drill a hole through panel positioned between the upper portion of the support structure and the lower portion of the support structure, and rivet injector means carried by the carriage and operable to inject a rivet through a hole drilled by the drill means.

13. The apparatus of claim 7 which includes a movable carriage, means supporting the movable carriage upon the upper portion of the support structure, drill means carried by the carriage and operable to drill a hole through panel positioned between the upper portion of the support structure and the lower portion of the support structure, and rivet injector means carried by the carriage and operable to inject a rivet through a hole drilled by the drill means, and liquid application means carried by the carriage and operable to apply a quantity of liquid to the panel after a hole has been drilled therethrough.

14. The apparatus of claim 7 which includes an enclosed housing attached to the main actuator member, a piston within the housing and movable upwardly and downwardly with respect thereto, means providing fluid pressure to the housing and urging the piston downwardly, and means attaching the lift member to the piston for movement therewith, the piston and the fluid under pressure serving as a cushion for movement of the lift member with respect to the panel.

15. The apparatus of claim 7 which includes an enclosed housing attached to the main actuator member, a piston within the housing and movable upwardly and downwardly with respect thereto, means providing fluid pressure to the housing and urging the piston downwardly, and means attaching the lift member to the piston, and means attaching the swage means to the piston, the piston and the fluid under pressure serving as a cushion for movement of the lift member and the swage means with respect to the panel.

16. The apparatus of claim 7 in which the rivet injector mechanism includes a carrier supported by the upper portion of the support structure and movable toward and away from the lower portion of the support structure, the carrier including retainer means for retaining a rivet, a rivet guide member carried by the carrieronduits between the check valves for forcing a precise volume of liquid from the liquid conduits to the nozzles and to the worf a rivet from the retainer means to the panel, resilient means carried by the carrier and urging the plunger in a direction away from the retainer means, a linearly movable actuator member, means connecting the linearly movable actuator member to the plunger, the actuator member being movable toward the lower portion of the support structure and moving the carrier toward the lower portion of the support structure for engagement of the rivet guide member with the panel, such movement of the carrier toward the panel being against the force of the resilient means but without significant relative movement betweem the carrier and the plunger, the actuator member being movable farther toward the lower portion of the support structure to move the plunger with respect to the carrier and to move a rivet from the retainer means within the guide means to the panel.

17. The apparatus of claim 16 in which the retainer means includes an elastomeric annular member, a rivet being movable to a position within the confines of the elastomeric annular member for retention of the rivet by the elastomeric annular member.

18. Te apparatus of claim 7 in which a panel which is positioned between the upper portion of the support structure and the lower portion of the support structure is provided with an opening therethrough, the apparatus including a clamping member supported by the upper portion of the support structure, and a stud attached to the clamping member and movable into the opening in a panel to position the panel with respect to the support structure.

19. The apparatus of claim 7 which includes a carriage movably supported by the upper portion of the support structure, drill means carried by the carriage, the rivet injector means also being supported by the carriage, a first fluid motor operably joined to the carriage for movement of the carriage, a second fluid motor operable to move the first fluid motor and the carriage to a first predetermined position, the first fluid motor being operable to move the carriage to a second predetermined position, the drill means and the rivet injector means thus being moved by the carriage to operation positions.

20. The apparatus of claim 7 in which the first transfer mechanism comprises a linearly movable shuttle member, the shuttle member having a first postion and a second position and including a retainer section movable from the first position to the second position to transfer a device from the first position to the second position, the second position of the shuttle member being one in which the retainer section is positioned above the main actuator member.

21. The apparatus of claim 7 which includes clamp mechanism carried by the upper portion of the support structure and clamp mechanism carried by the lower portion of the support structure and operable to clamp a panel between the upper portion of the support structure and the lower portion of the support structure for retaining the position of the panel as a device is attached thereto, means joining a portion of the clamp mechanism to the main actuator member.

* * * * *

UNITED STATES PATENT AND TRADEMARK OFFICE
CERTIFICATE OF CORRECTION

PATENT NO. : 4,578,846
DATED : April 9, 1986
INVENTOR(S) : John F. Schott and Thomas E. Endres It is certified that error appears in the above-identified patent and that said Letters Patent are hereby corrected as shown below:

Column 6, line 62, change "70" to ---700---.

Column 11, delete lines 55, 56, and 57, and substitute therefor: ---carrier for guiding a rivet from the retainer means to the panel, a plunger movable with respect to the retainer means for movement of a rivet from the retainer means---.

Column 12, line 20, change "Te" to ---The---.

Column 12, line 43, change "postion" to ---position---.

Signed and Sealed this

Twenty-second Day of July 1986

[SEAL]

Attest:

DONALD J. QUIGG

Attesting Officer

Commissioner of Patents and Trademarks